United States Patent
Ersoy

(10) Patent No.: US 7,334,496 B2
(45) Date of Patent: Feb. 26, 2008

(54) GEARSHIFT DEVICE FOR CONTROLLING THE GEAR SELECTION OF A MOTOR VEHICLE GEARBOX

(75) Inventor: Metin Ersoy, Walluf (DE)

(73) Assignee: ZF Lemförder Metallwaren AG, Stemwede-Dielingen (DE)

(*) Notice: Subject to any disclaimer, the term of this patent is extended or adjusted under 35 U.S.C. 154(b) by 685 days.

(21) Appl. No.: 10/484,852

(22) PCT Filed: Mar. 20, 2003

(86) PCT No.: PCT/DE03/00922

§ 371 (c)(1),
(2), (4) Date: Jan. 22, 2004

(87) PCT Pub. No.: WO03/081088

PCT Pub. Date: Oct. 2, 2003

(65) Prior Publication Data

US 2004/0211281 A1 Oct. 28, 2004

(30) Foreign Application Priority Data

Mar. 26, 2002 (DE) .................. 102 13 763

(51) Int. Cl.
*F16H 59/10* (2006.01)
(52) U.S. Cl. ............... 74/473.12; 74/473.3; 324/207.2; 324/207.22; 324/207.25; 356/138; 356/614
(58) Field of Classification Search ............. 74/473.12, 74/335, 473.3; 324/207.2, 207.22, 207.25; 356/138, 614
See application file for complete search history.

(56) References Cited

U.S. PATENT DOCUMENTS

| | | | | |
|---|---|---|---|---|
| 4,519,266 | A * | 5/1985 | Reinecke | 74/471 XY |
| 5,035,113 | A * | 7/1991 | Simonyi et al. | 74/473.12 |
| 5,811,747 | A * | 9/1998 | Taniguchi et al. | 200/61.88 |
| 5,969,519 | A | 10/1999 | Steiling et al. | |
| 6,155,128 | A | 12/2000 | Ersoy et al. | |
| 6,209,408 | B1 | 4/2001 | DeJonge et al. | |
| 6,305,075 | B1 * | 10/2001 | Ersoy et al. | 29/829 |
| 6,351,699 | B1 | 2/2002 | Loibl | |
| 6,931,961 | B2 * | 8/2005 | Bauer et al. | 74/473.12 |
| 2002/0056334 | A1 * | 5/2002 | Fujinuma | 74/473.1 |

FOREIGN PATENT DOCUMENTS

DE 42 90 856 2/1994

(Continued)

*Primary Examiner*—William C Joyce
(74) *Attorney, Agent, or Firm*—McGlew and Tuttle, P.C.

(57) ABSTRACT

A shifting device is provided for controlling the gear selection of a motor vehicle transmission with a housing, with a gearshift lever, which is arranged within a recess of the housing and can be pivoted in at least one vertical plane. A cover plate follows the pivoting movement of the gearshift lever due to its coupling with the gearshift lever. A scanning device includes sensors and corresponding signal transmitters for detecting the individual gear positions of the transmission. The scanning device has a sensor (10) arranged stationarily at the housing and a linear signal transmitter unit (13) at the pivotable cover plate (14), which said signal transmitter unit (13) sweeps over the scanning range of the sensor (9) and is provided with mark points for the gear positions, wherein the signals picked up by the sensor for the gear position are sent to a corresponding processor unit (12) for evaluation and forwarding. The shifting device for motor vehicle transmissions is inexpensive and reliable in operation.

18 Claims, 2 Drawing Sheets

FOREIGN PATENT DOCUMENTS

| | | |
|---|---|---|
| DE | 695 11 063 | 9/1996 |
| DE | 196 21 404 | 11/1996 |
| DE | 196 50 154 | 6/1998 |
| EP | 0 787 625 | 8/1997 |
| EP | 0 844 418 | 5/1998 |
| EP | 0 846 898 | 6/1998 |
| EP | 1 046 839 | 10/2000 |
| EP | 1 077 337 | 2/2001 |

* cited by examiner

GEARSHIFT DEVICE FOR CONTROLLING THE GEAR SELECTION OF A MOTOR VEHICLE GEARBOX

FIELD OF THE INVENTION

The present invention pertains to a shifting device for controlling the gear selection of a motor vehicle transmission with a housing, with a gearshift lever, which is arranged within a recess of the housing and can be pivoted in at least one vertical plane, with a cover plate, which follows the pivoting movement of the gearshift lever due to its coupling with the gearshift lever, and with a scanning device comprising sensors and corresponding signal transmitters for detecting the individual gear positions of the transmission.

BACKGROUND OF THE INVENTION

The signals detected by the scanning device to characterize the individual gear positions are usually obtained in shifting devices of the type described above by optical sensors or magnetic Hall sensors being arranged for every individual gear position on a so-called printed circuit board arranged at the housing. When the gearshift lever and consequently the cover plate are pivoted from one gear position to the other, a magnet or optical signal transmitter fastened to the pivotable cover plate is moved at the same time, and the said sensor or optical signal transmitter generates a control signal in the corresponding sensor when the particular gear position selected is reached.

Since automatic transmissions are increasingly provided with additional gear positions, in which case up to eight different Hall sensors, optical sensors, microswitches or potentiometers scan the individual gear positions, it is easy to imagine that the cost for the shifting device is rather substantial because of the increased manufacturing effort involved in the assembly of the numerous individual components, and the individual cost of the components must be additionally taken into account as well.

SUMMARY OF THE INVENTION

The object of the present invention is therefore to improve a shifting device of the this type such that its manufacturing costs can be reduced and the function and reliability must also meet the highest requirements in terms of easy and comfortable operation.

According to the present invention, a shifting device is provided for controlling the selection of a motor vehicle transmission with a housing and with a gearshift within a recess of the housing. The gear shift lever can be pivoted in at least one vertical plane. A cover plate is coupled with the gearshift lever and follows the pivoting movement of the gearshift lever. The cover plate has a scanning device comprising sensors and corresponding signal transmitters for detecting the individual gear positions of the transmission. The scanning device has at least one sensor arranged stationarily at the housing and a linear signal transmitter unit at the pivotable cover plate. The signal transmitter unit sweeps over the scanning range of the sensor during the movement of the cover plate and is provided with mark points or modulations for the gear positions. The signals picked up by the sensor for the gear positions are sent to a corresponding processor unit for evaluation and for forwarding.

The novel design of the scanning device makes it possible to substantially reduce the number of components used for the scanning device which is decisive for the determination of the gear position. Not only does this reduction bring about a reduction in the costs of the components and assembly, but it also leads to less stringent requirements on the manufacturing process in terms of the accuracy of fixation of the individual components, because a smaller number of components are to be placed.

The shifting devices known so far from the state of the art have the numerous sensors belonging to the scanning device arranged on a so-called printed circuit board, on which they are to be mounted by individual soldering operations. In the embodiment of the shifting device according to the present invention, only one sensor needs to be placed at the housing or a separate printed circuit board fixed to the housing, and it is additionally advantageous that the linear signal transmitter unit on the cover plate is made tolerance-insensitive in relation to the passage through the scanning position of the corresponding sensor by the corresponding selection of the size.

It proved to be expedient in the course of a suitable embodiment for the linear signal transmitter unit to have a plurality of optical marks corresponding to the gear positions and for the sensor to be designed as an optical sensor, because this special embodiment can be embodied with simple technological means and corresponding optical sensors are commercially available under favorable terms. As a variant of the optical scanning principle, it is possible to design the sensor unit as a laser scanning unit, which scans a strip code, also called bar code, in which case the signal transmitter unit is designed as such a bar code.

Moreover, it is conceivable to design the optical marks of the signal transmitter unit as reflecting line marks.

As an alternative to the optical scanning principle, the linear signal transmitter unit may have a plurality of magnetic marks in the form of a magnetic strip for certain applications, in which case the corresponding sensor is designed as a Hall sensor. The magnetic scanning principle has proved to be quite successful in terms of reliability in shifting devices of motor vehicle transmissions, so that inexpensive manufacture of the overall shifting device is guaranteed with the reduction in the number of components according to the present invention.

Since the semi-automatic gear selection by the user within the framework of the upshifting and downshifting of the gears by tapping the gearshift lever, where the upshifting and downshifting take place in a second vertical shifting plane or shift gate of the gearshift lever, into which the gearshift lever is brought by pivoting at right angles to the first vertical plane of pivoting, has come into common use in motor vehicle transmissions of the more recent design, especially in automatic transmissions, besides the gear selection, another expedient variant of the shifting device according to the present invention makes provisions for the scanning device to have an additional sensor arranged at the housing, which sensor scans the gear positions in this additional vertical plane of pivoting of the gearshift lever, where the linear signal transmitter unit passes correspondingly through the sensor position of this additional sensor during the pivoting of the gearshift lever into the additional plane of movement. As an alternative to this, an additional linear signal transmitter unit may be arranged at the movable cover plate, which generates the necessary gear position scanning signals during the pivoting of the gearshift lever in the second shifting plane.

Existing tolerances and possible clearance within the path of pivoting movement of the gearshift lever, which is caused by wear, can be compensated, moreover, corresponding to an advantageous variant by the scanning device having an additional initializing sensor and by a signal transmitter, which corresponds to the sensor in the neutral or park position of the shifting device, being present on the pivotable cover plate. Due to this design, a new zero position can be generated by the signal obtained additionally during the pick-up of the corresponding park or neutral position signal by the initializing sensor and by the processing of the signal in the corresponding processor unit whenever the gearshift lever is returned into the neutral or park position due to the interplay of the additional initializing sensor and the additional signal transmitter, and the individual gear positions, which are passed through within the framework of the pivoting of the gearshift lever, can be unambiguously assigned starting from the new zero position.

The above-described sensor or sensors for detecting the individual gear positions, for initializing the shifting device as well as for picking up signals that are generated by the movement of the gearshift lever in a second plane of pivoting, can be expediently fixed with the corresponding processor unit on a curved printed circuit board arranged separately on the transmission. This printed circuit board may be manufactured and tested in a preceding production step prior to the assembly of the shifting device, so that the assembly effort needed for the shifting device proper decreases.

The manufacturing costs can be reduced, furthermore, in such a way that the pivotable cover plate is not designed as a separate component arranged on the gearshift lever, but it also acts at the same time as a louver-like component to cover the recess in the housing, which recess accommodates the gearshift lever.

Exemplary embodiments of the subject of the present invention will be explained in greater detail below on the basis of the drawings attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
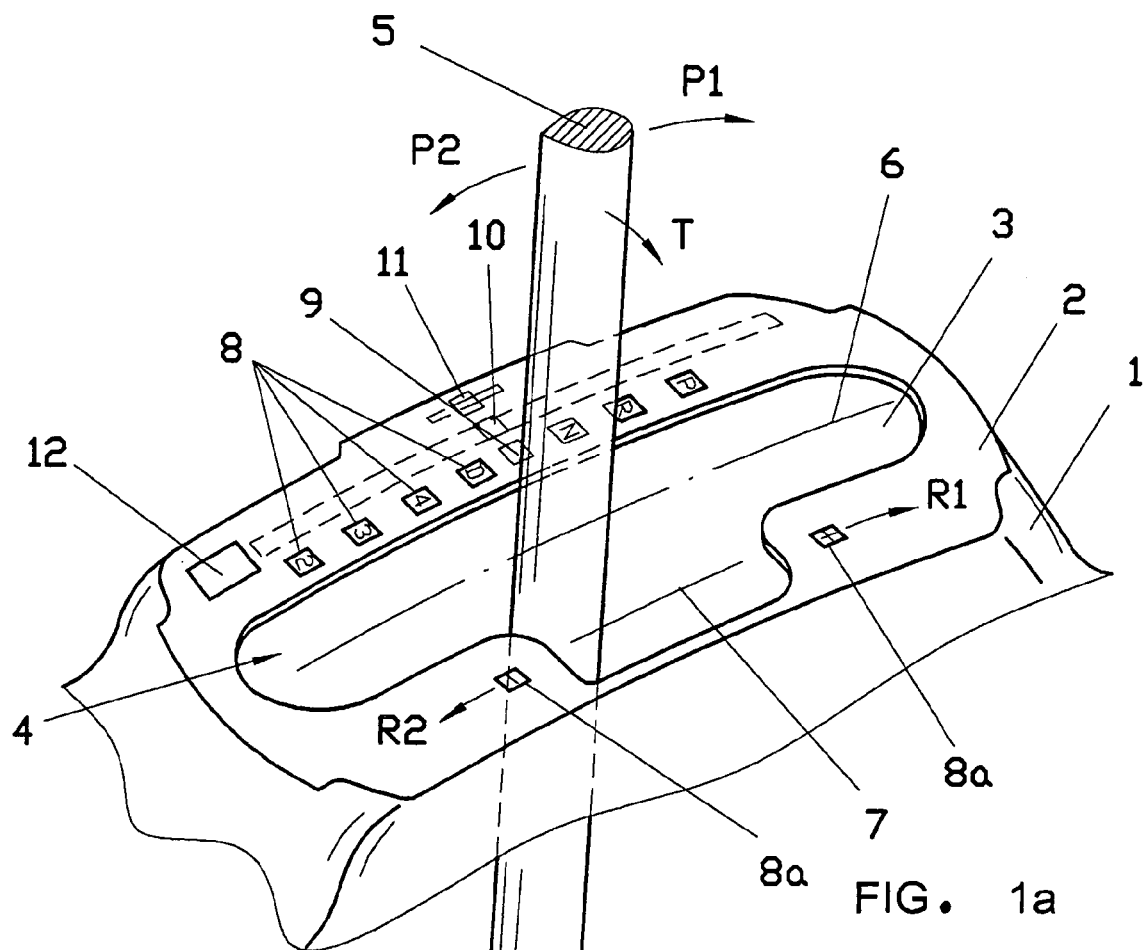
FIG. 1a is a partial perspective view of a shifting device according to the present invention in the area of the gearshift lever with the corresponding planes of movement.
Figure 1B:
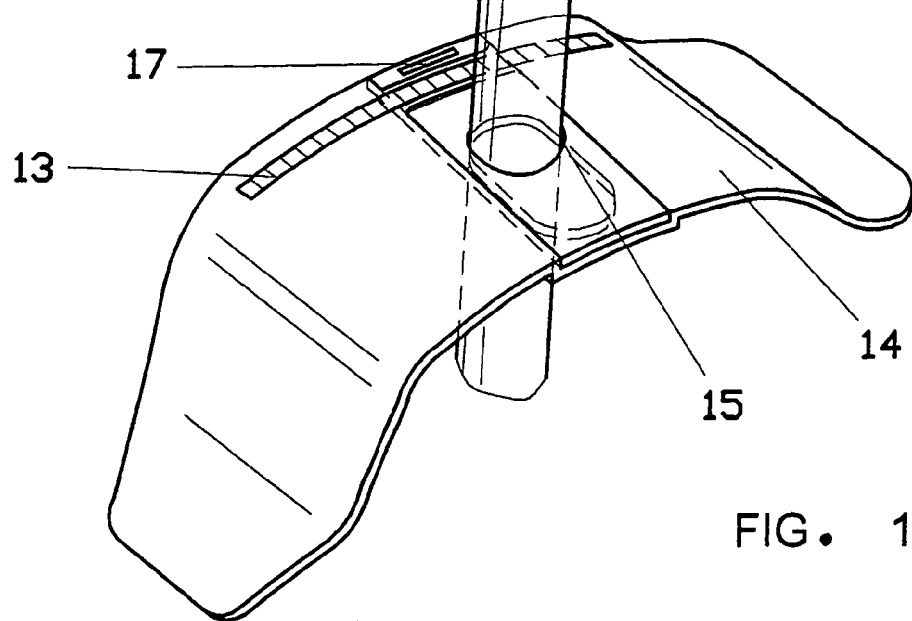
FIG. 1b is a perspective detail view of the movable gearshift lever with adjoining components in the first plane of pivoting.

Referring to the drawings in particular, the view of the shifting device for controlling the gear selection of a motor vehicle transmission, which is shown in FIG. 1a, shows as the essential elements a part of the housing 1, on the top side of which a curved printed circuit board 2 is arranged or supported (as a supported part). The printed circuit board 2 is used as a carrier element for the components described in detail below and has an opening 3 located in the middle area of the printed circuit board 2. This opening 3 is joined toward the interior of the housing 1 by a recess 4, in which a gearshift lever 5 is arranged in a movably mounted manner. The mobility of the gearshift lever 5 extends essentially to a first vertical plane of pivoting 6, whose position is indicated by broken lines in FIG. 1a, and in which the gearshift lever 5 for operating the motor vehicle can be pivoted in the directions of the arrows P1 and P2. In parallel to the first plane of pivoting 6, the shifting device has another, second plane of pivoting 7, which is arranged in parallel thereto and in which the gearshift lever 5 can be moved in the direction of the arrows R1 and R2. The displacement of the gearshift lever 5 from the plane of pivoting 6 to the plane of pivoting 7 is brought about by displacing the gearshift lever 5 in the direction of the arrow T.

As can be determined from FIG. 1a, a number of essentially electronic components are contained on the printed circuit board 2 acting as a carrier element. Thus, the printed circuit board 2 has a number of illuminated position fields 8 and 8a for indicating the individual positions of the gearshift lever 5, which designate a gear position each. Corresponding gear position designations such as P, R, N, D, 4, 3, 2 are shown on the top side of the position fields designated by 8, the position fields 8a being designated by "+" and "−" and as a result, they designate the gear positions for manual upshifting and downshifting of the gears of the connected motor vehicle transmission.

In addition, a row with three sensors 9, 10 and 11 arranged next to each other as well as a processor unit 12 for processing the data provided by the sensors 9, 10 and 11 are located on the printed circuit board 2, on its underside. The processor unit 12 is formed by a usual microchip or CAN processor. The sensors 9, 10 and 11 may be designed as optical sensors or as Hall sensors. They are part of a scanning device for recognizing the gear position of the gearshift lever and cooperate with a linear signal transmitter unit 13, which is arranged on a cover plate 14 on its top side directed toward the printed circuit board.

Figure 2:
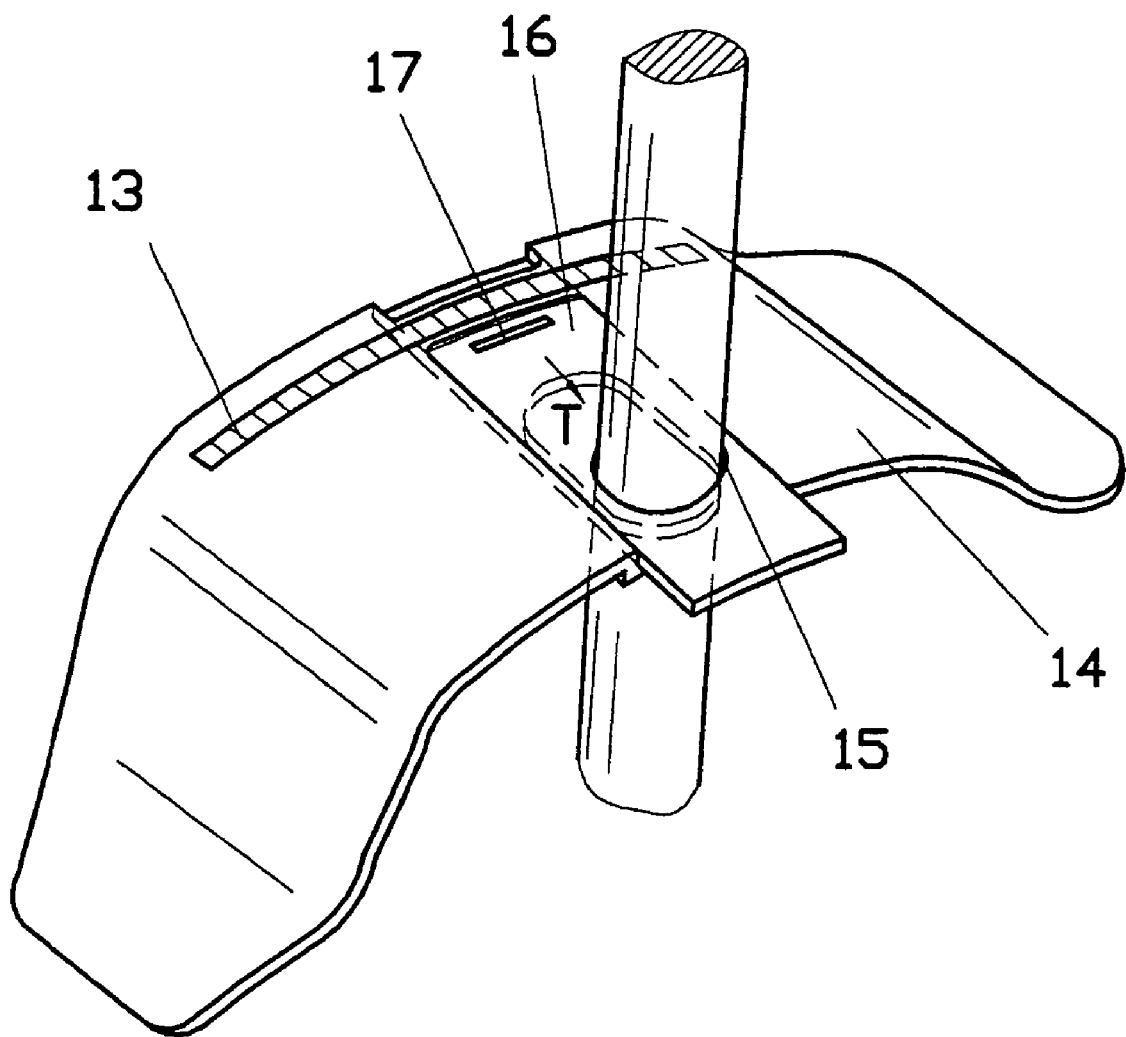
FIG. 2 is a perspective detail view of the movable gearshift lever with adjoining components in the second plane of pivoting.

The cover plate 14 is shown in FIG. 2 as an individual part together with the gearshift lever 5 and has a slide 16 with a circular opening 15. The cover plate 14 with the slide 16 form a louver arrangement.

The slide 16 is arranged in a suitable mount at the cover plate 14, displaceably in the direction of arrow T in FIG. 1a, and the shaft of the gearshift lever 5 is passed through the opening 15.

The signal transmitter unit 13 is arranged on the cover plate 14 such that the signal transmitter unit 13 crosses the sensor position of sensor 10 during a pivoting of the gearshift lever 5 in the plane of pivoting 6. This is illustrated by the view in broken lines in FIG. 1a. The signal transmitter unit 13 has a plurality of marks or modulations in the form of lines, which extend at right angles to the plane of pivoting 6 and can be recognized by the corresponding, optically operating sensor 10. The pivoting of the gearshift lever 5 within the plane of pivoting 6 thus leads to a number of signal pulses due to the signal transmitter unit 13 sweeping over the scanning area of the sensor 10, and these signal pulses are sent to the processor unit 12 via strip conductors of the printed circuit board 2, which are not shown more specifically, and they are counted and evaluated there, so that the gear position of the gearshift lever 5 can be exactly determined from the number of signal pulses received. A sensor 11, which has the task of initializing the zero position of the gearshift lever 5, is located next to the sensor 10 on the printed circuit board 2. An additional, elongated signal transmitter unit 17 is arranged corresponding to this on the slide 16 of the cover plate 14. Inaccuracies of the gear position, which are due to tolerances, can thus be used to calibrate the scanning device during each passage through the neutral or park position (N, P).

The sensor 9, which is responsible for scanning the gear position as soon as the gearshift lever 5 has been displaced into the plane of pivoting 7 and is moved in the direction of the arrows R1 and R2 there, is located on the side of the sensor 10 located opposite the sensor 11. Due to the movement of the gearshift lever 5 in the direction of arrow T, the position of the signal transmitter unit 17 is displaced together with the slide 16, so that it now supplies the sensor 9 with corresponding signal pulses with the line marks arranged on it.

A scanning device, which can detect all gear positions of the gearshift lever 5 with the simplest means and can forward them electronically to the corresponding motor vehicle transmission after processing by means of the processor unit 12, is thus created by means of a central sensor 10 as well as the supplementary sensors 9 and 11 and the signal transmitter unit 13 as well as the signal transmitter unit 17. In its combination with sensors 9, 10 and 11 and signal transmitter units 13, 17, the scanning device may be based, e.g., on the optical principle, as it has hitherto been described and as it is expressed by the design of the signal transmitter units 13 and 17 with a line mark each. A special type of the optical principle can be embodied by applying a line code, also called bar code, on the signal transmitter unit (13, 17) and by designing the sensors 9, 10 and 11 as microlaser units.

Another embodiment of the scanning principle is the so-called magnetic scanning. The signal transmitter unit (13, 17) is provided in this case as a magnetic strip with numerous individual magnetic marks and is scanned by sensors (9, 10 and 11) designed as so-called Hall sensors. The principle of recognition is the same in both cases, because the signal pulses obtained by means of the scanning device are processed within the processor unit 12, so that an unambiguous recognition of the individual gear positions is achieved.

To additionally increase the reliability of the scanning, it may be conceivable as a special embodiment variant that the sensors 9 and 10 are arranged in duplicate on the printed circuit board 2, so that redundancy of the signal recognition is achieved due to the duplicate arrangement.

The gear position recognition by means of the sensors 9 and 10 can also be brought about by the cover plate 14 being also moved in the corresponding direction during the pivoting of the gearshift lever 5 in the direction of the arrow T, so that the signal transmitter unit 13 can cooperate with the sensor 9. The slide 16 is eliminated in this case, and the gearshift lever 5 is passed directly through a circular opening in the cover plate 14. The signal transmitter 17 is located directly on the cover plate 14 in this exemplary embodiment described.

While specific embodiments of the invention have been shown and described in detail to illustrate the application of the principles of the invention, it will be understood that the invention may be embodied otherwise without departing from such principles.

LIST OF REFERENCE NUMBERS

1 Housing
2 Printed circuit board
3 Opening
4 Recess
5 Gearshift lever
6 Plane of pivoting
7 Plane of pivoting
8 Position field
8a Position field
9 Sensor
10 Sensor
11 Sensor
12 Processor unit
13 Signal transmitter unit
14 Cover plate
15 Opening
16 Slide
17 Signal transmitter unit

The invention claimed is:

1. A shifting device for controlling the gear selection of a motor vehicle transmission, the shifting device comprising:
   a housing;
   a gearshift lever, which is arranged within a recess of the housing and can be pivoted in at least one vertical plane;
   a cover plate, which follows the pivoting movement of the gearshift lever due to its coupling with the gearshift lever;
   a scanning device with at least one sensor arranged stationarily at the housing and a linear signal transmitter unit at the cover plate, said signal transmitter unit includes a plurality of mark points that sweep over the scanning range of the one sensor during the movement of the cover plate; and
   a processor unit, wherein the signals picked up by the sensor from the plurality of mark points sweeping past the one sensor are sent to the processor unit for evaluation of gear positions and for forwarding.

2. A shifting device in accordance with claim 1, wherein the linear signal transmitter unit has a plurality of optical marks corresponding to the gear positions, and the sensor is designed as an optical sensor.

3. A shifting device in accordance with claim 2, wherein the signal transmitter unit has a line code or bar code, and the sensor is designed as a laser scanning unit.

4. A shifting device in accordance with claim 1, wherein the linear signal transmitter unit is designed in the form of a magnetic strip with a plurality of magnetic marks, and the sensor is designed as a Hall sensor.

5. A shifting device in accordance with claim 1, wherein the scanning device has an additional sensor, which is arranged stationarily at the housing and scans the gear positions in an additional vertical plane of pivoting of the gearshift lever, wherein an additional linear signal transmitter unit passes through the scanning range of the additional sensor during the pivoting of the gearshift lever into the additional plane of movement.

6. A shifting device in accordance with claim 1, wherein the scanning device has a additional sensor, which is arranged stationarily at the housing and scans the gear positions in an additional vertical plane of pivoting of the gearshift lever, wherein the linear signal transmitter unit passes through the scanning range of the additional sensor during the pivoting of the gearshift lever into the additional plane of movement.

7. A shifting device in accordance with claim 1, wherein the sensor or sensors for detecting the individual gear positions and the corresponding processor unit for evaluating the signals picked up are fixed on a curved printed circuit board arranged at the housing.

8. A shifting device in accordance with claim 1, wherein said cover part comprises a louver covering the a recess in said supported part, said recess accommodating said gearshift lever.

9. A shifting device for controlling a gear selection, the shifting device comprising:
a vehicle supported part;
a gearshift lever movable relative to said supported part;
a linear signal transmitter unit arranged movable with said gearshift lever, said transmitter unit including a plurality of modulations;
a sensor fixed to said supported part and arranged to read said modulations as said gearshift lever moves;
a processor unit connected to said sensor and counting a number of modulations read by said sensor, said processor unit determining a plurality of different gear positions from said number of modulations;
said vehicle supported part being a curved printed circuit board with said sensor for detecting the individual gear positions and said processor unit evaluating the signals picked up being fixed on said curved printed circuit board.

10. A shifting device in accordance with claim 9, wherein said plurality of modulations of said linear signal transmitter unit are a plurality of optical marks corresponding to the gear positions, and said sensor is an optical sensor.

11. A shifting device in accordance with claim 10, wherein said signal transmitter unit has a bar code, and said sensor comprises a laser scanning unit.

12. A shifting device in accordance with claim 10, wherein said optical marks of said signal transmitter unit comprise reflecting line marks.

13. A shifting device in accordance with claim 9, wherein said linear signal transmitter unit comprises a magnetic strip with a plurality of magnetic marks, and said sensor comprises a Hall sensor.

14. A shifting device in accordance with claim 9, further comprising:
an additional sensor arranged stationarily at said supported part for scanning gear positions in an additional vertical plane of pivoting of the gearshift lever; and
an additional linear signal transmitter unit passing through the scanning range of said additional sensor during the pivoting of said gearshift lever into the additional plane.

15. A shifting device in accordance with claim 9, further comprising:
an additional sensor arranged stationarily at said supported part for scanning gear positions in an additional vertical plane of pivoting of said gearshift lever, said linear signal transmitter unit passing through the scanning range of said additional sensor during the pivoting of said gearshift lever into the additional plane.

16. A shifting device in accordance with claim 9, further comprising:
an additional sensor;
an additional signal transmitter unit corresponding to said additional sensor in the neutral or park position of the shifting device at said pivotable part.

17. A shifting device for controlling the gear selection of a motor vehicle transmission, the shifting device comprising:
a housing;
a gearshift lever, which is arranged within a recess of the housing and can be pivoted in at least one vertical plane;
a cover plate, which follows the pivoting movement of the gearshift lever due to its coupling with the gearshift lever;
a scanning device with at least one sensor arranged stationarily at the housing and a linear signal transmitter unit at the cover plate, said signal transmitter unit sweeps over the scanning range of the sensor during the movement of the cover plate and includes a plurality of optical marks designed as reflecting line marks corresponding to the gear positions, the sensor being designed as an optical sensor;
a processor unit, wherein the signals picked up by the sensor for the gear positions are sent to the processor unit for evaluation and for forwarding.

18. A shifting device for controlling the gear selection of a motor vehicle transmission, the shifting device comprising:
a housing;
a gearshift lever, which is arranged within a recess of the housing and can be pivoted in at least one vertical plane;
a cover plate, which follows the pivoting movement of the gearshift lever due to its coupling with the gearshift lever;
a scanning device with at least one sensor arranged stationarily at the housing and a linear signal transmitter unit at the cover plate, said signal transmitter unit sweeps over the scanning range of the sensor during the movement of the cover plate and is provided with mark points interacting with the sensor for the gear positions, the scanning device having an additional initializing sensor, and having another signal transmitter unit corresponding to the additional initializing sensor in the neutral or park position of the shifting device at the pivotable cover plate; and
a processor unit, wherein the signals picked up by the sensor for the gear positions are sent to the processor unit for evaluation and for forwarding.

* * * * *